United States Patent
Fang et al.

(10) Patent No.: US 12,159,231 B2
(45) Date of Patent: Dec. 3, 2024

(54) PREDICTIVE DATA ANALYTICS WITH AUTOMATIC FEATURE EXTRACTION

(71) Applicant: Optum Services (Ireland) Limited, Dublin (IE)

(72) Inventors: Dong Fang, Dublin (IE); Peter Cogan, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 1147 days.

(21) Appl. No.: 16/209,249

(22) Filed: Dec. 4, 2018

(65) Prior Publication Data

US 2020/0175314 A1    Jun. 4, 2020

(51) Int. Cl.
| | |
|---|---|
| *G06N 3/084* | (2023.01) |
| *G06F 18/10* | (2023.01) |
| *G06F 18/2113* | (2023.01) |
| *G06F 18/214* | (2023.01) |
| *G06N 3/08* | (2023.01) |
| *G06N 5/00* | (2023.01) |
| *G06N 20/00* | (2019.01) |

(52) U.S. Cl.
CPC ............. *G06N 3/084* (2013.01); *G06F 18/10* (2023.01); *G06F 18/2113* (2023.01); *G06F 18/214* (2023.01); *G06N 3/08* (2013.01); *G06N 5/00* (2013.01); *G06N 20/00* (2019.01)

(58) Field of Classification Search
None
See application file for complete search history.

(56) References Cited

U.S. PATENT DOCUMENTS

| | | |
|---|---|---|
| 7,472,097 B1 | 12/2008 | Scarborough et al. |
| 2016/0259887 A1 | 9/2016 | Min et al. |

FOREIGN PATENT DOCUMENTS

WO    WO-2018212710 A1 *  11/2018  ............. G06F 15/76

OTHER PUBLICATIONS

Ferrucci A Framework for Genetic Algorithms Based on Hadoop, arXiv, 2013 (Year: 2013).*
Tsang Detecting Statistical Interactions from Neural Network Weights, arXiv, Feb. 2018 (Year: 2018).*
Diaz-Gomez Initial Population for Genetic Algorithms A Metric Approach, GEM 2007, p. 43-49 (Year: 2007).*

(Continued)

*Primary Examiner* — Aniss Chad
*Assistant Examiner* — Shien Ming Chou
(74) *Attorney, Agent, or Firm* — Alston & Bird LLP

(57) ABSTRACT

There is a need for solutions that predictive data analytics with improved training efficiency and/or accuracy. This need can be addressed by, for example, processing an original feature entry to generate a group of low-order feature values, including performing a first number of iterations of a feature engineering transformation to generate a group of engineered feature values and determining the group of low-ordered feature values based on a number of feature values from the group of engineered feature values; processing the original feature entry to generate a group of high-order feature values; merging the group of low-order feature values and the group of high-order feature values to generate a processed feature entry corresponding to the original feature entry; and providing the processed feature entry as an input to a prediction unit.

13 Claims, 8 Drawing Sheets

(56) References Cited

OTHER PUBLICATIONS

Ribalta, Band Selection from Hyperspectral Images Using Attention-based Convolutional Neural Networks, arXiv, Oct. 2018 (Year: 2018).*
Lee, Recursive Recurrent Nets with Attention Modeling for OCR in the Wild, arXiv, 2016, (Year: 2016).*
Han, Deep Compression Compressing Deep Neural Networks with Pruning Trained Quantization, arXiv, 2016 (Year: 2016).*
Hettinger Forward Thinking Building and Training Neural Networks One Layer at a Time, arXiv, 2017 (Year: 2017).*
Guo, DeepFM a Factorization-Machine based Neural Network for CTR Prediction arXiv, 2017 (Year: 2017).*
Xu Synergies that Matters Efficient Interaction Selection via Sparse Factorization Machine, Proceedings of the 2016 SIAM international conference on Data Mining, Society for Industrial and Applied Mathematics, p. 108-116 (Year: 2016).*
Zheng Wide and Deep Convolutional Neural Networks for Electricity-Theft Detection to Secure Smart Grids, IEEE Transactions on Industrial Information, vol. 14 No. 4, Apr. 2018 (Year: 2018).*
Yang, a new feature selection based on comprehensive measurement both in inter-category and intra-category for text categorization, Information Processing and Management 48, 2012 (Year: 2012).*
Peng, Haoyuan et al. "Attention-Based Belief Or Disbelief Feature Extraction For Dependency Parsing," The Thirty-Second AAAI Conference On Artificial Intelligence (AAAI-18), vol. 32, No. 1, pp. 5382-5389, Apr. 27, 2018.
Chen, Tianqi et al. "XGBoost: A Scalable Tree Boosting System," In Proceedings of the 22nd ACM SIGKDD International Conference On Knowledge Discovery and Data Mining, Aug. 13, 2016, pp. 785-794. DOI: 10.1145/2939672.2939785.
Cheng, Heng-Tze et al. "Wide & Deep Learning For Recommender Systems," In Proceedings Of The 1st Workshop On Deep Learning For Recommender Systems, Sep. 15, 2016, pp. 7-10, Boston, Massachusetts. DOI: 10.1145/2988450.2988454.
Guo, Huifeng et al. "DeepFM: A Factorization-Machine Based Neural Network For CTR Prediction," In Proceedings of the 26th International Joint Conference on Artificial Intelligence (IJCAI), Mar. 13, 2017, (8 pages), arXiv preprint arXiv:1703.04247.
Lee, Chia-Yen et al. "Data Science Framework For Variable Selection, Metrology Prediction, and Process Control In TFT-LCD Manufacturing," Robotics and Computer-Integrated Manufacturing, Feb. 2019, vol. 55, pp. 76-87. [Retrieved From The Internet Sep. 3, 2019] <https://www.sciencedirect.com/science/article/abs/pii/S0736584518300632?via%3Dihub>.
Li, Chun-Liang et al. "Combination of Feature Engineering and Ranking Models For Paper-Author Identification In KDD Cup 2013," The Journal of Machine Learning Research, (2015), vol. 16, No. 1, pp. 2921-2947.
Qu, Yanru et al. "Product-Based Neural Networks For User Response Prediction," In 2016 IEEE 16th International Conference on Data Mining (ICDM), Nov. 1, 2016, pp. 1149-1154, arXiv:1611.00144v1.
Rendle, Steffen. "Factorization Machines," 2010 IEEE International Conference On Data Mining, Dec. 13, 2010, (6 pages). DOI: 10.1109/ICDM.2010.127.
Srivastava, Rupesh Kumar et al. "Highway Networks," Nov. 3, 2015, (6 pages), arXiv preprint arXiv:1505.00387v2.
Tsang, Michael et al. "Detecting Statistical Interactions From Neural Network Weights," ICLR 2018 Conference blind Submission, Feb. 2018, (21 pages). arXiv preprint arXiv:1705.04977.

* cited by examiner

PREDICTIVE DATA ANALYTICS WITH AUTOMATIC FEATURE EXTRACTION

BACKGROUND

Some data domains, such as data domains related to healthcare and financial services applications, include data collections that are highly sparse and/or have a high-cardinality. Applicant has identified substantial problems related to training efficiency and/or accuracy of conventional machine learning frameworks for processing data having high sparsity and/or cardinality. In particular, Applicant has identified that, when their input feature values have a high sparsity and/or cardinality, machine learning frameworks configured to process those feature values may be more difficult or impossible to train. Through innovative endeavors, Applicant has identified solutions for technological problems related to training efficiency and/or accuracy of machine learning frameworks that use highly sparse/high cardinality categorical data.

BRIEF SUMMARY

In general, embodiments of the present invention provide methods, apparatus, systems, computing devices, computing entities, and/or the like for predictive data analytics with low-order feature extraction. Certain embodiments utilize systems, methods, and computer program products that enable a predictive analysis system having a higher training efficiency when trained to perform predictions using high sparsity and/or high cardinality data.

In accordance with one aspect, a method is provided. In one embodiment, the method comprises obtaining an original feature entry; processing the original feature entry to generate a group of low-order feature values, including performing a first number of iterations of a feature engineering transformation to generate a group of engineered feature values and determining the group of low-ordered feature values based on a second number of feature values from the group of engineered feature values, wherein performing each iteration of the feature engineering transformation comprises: (i) identifying a group of input feature values for the iteration; (ii) identifying a group of input feature value pairs, wherein each input feature value pair from the group of input feature value pairs includes a first feature value from the group of input feature values and a second feature value from the group of input feature values; (iii) for each input feature value pair from the group of input feature value pairs, performing a pairwise transformation of the first feature value in the input feature value pair and the second feature value in the input feature value pair to generate a corresponding interactive feature value for the input feature value pair; (iv) for each interactive feature value associated with an input feature value pair from the group of input feature value pairs, determining a scored interactive feature value associated with the input feature value pair based on the interactive feature value and an interactive scoring parameter for the interactive feature value; and (v) from each scored interactive feature value associated with an input feature value pair from the group of input feature value pairs, selecting a third number of scored interactive feature values as a group of output feature values; processing the original feature entry to generate a group of high-order feature values; merging the group of low-order feature values and the group of high-order feature values to generate a processed feature entry corresponding to the original feature entry; and providing the processed feature entry as an input to a prediction unit, wherein the prediction unit is configured to generate one or more predictions using the processed feature entry.

In accordance with another aspect, a computer program product is provided. The computer program product may comprise at least one computer-readable storage medium having computer-readable program code portions stored therein, the computer-readable program code portions comprising executable portions configured to obtain an original feature entry; process the original feature entry to generate a group of low-order feature values, including performing a first number of iterations of a feature engineering transformation to generate a group of engineered feature values and determining the group of low-ordered feature values based on a second number of feature values from the group of engineered feature values, wherein performing each iteration of the feature engineering transformation comprises: (i) identifying a group of input feature values for the iteration; (ii) identifying a group of input feature value pairs, wherein each input feature value pair from the group of input feature value pairs includes a first feature value from the group of input feature values and a second feature value from the group of input feature values; (iii) for each input feature value pair from the group of input feature value pairs, performing a pairwise transformation of the first feature value in the input feature value pair and the second feature value in the input feature value pair to generate a corresponding interactive feature value for the input feature value pair; (iv) for each interactive feature value associated with an input feature value pair from the group of input feature value pairs, determining a scored interactive feature value associated with the input feature value pair based on the interactive feature value and an interactive scoring parameter for the interactive feature value; and (v) from each scored interactive feature value associated with an input feature value pair from the group of input feature value pairs, selecting a third number of scored interactive feature values as a group of output feature values; processing the original feature entry to generate a group of high-order feature values; merging the group of low-order feature values and the group of high-order feature values to generate a processed feature entry corresponding to the original feature entry; and providing the processed feature entry as an input to a prediction unit, wherein the prediction unit is configured to generate one or more predictions using the processed feature entry.

In accordance with yet another aspect, an apparatus comprising at least one processor and at least one memory including computer program code is provided. In one embodiment, the at least one memory and the computer program code may be configured to, with the processor, cause the apparatus to obtain an original feature entry; process the original feature entry to generate a group of low-order feature values, including performing a first number of iterations of a feature engineering transformation to generate a group of engineered feature values and determining the group of low-ordered feature values based on a second number of feature values from the group of engineered feature values, wherein performing each iteration of the feature engineering transformation comprises: (i) identifying a group of input feature values for the iteration; (ii) identifying a group of input feature value pairs, wherein each input feature value pair from the group of input feature value pairs includes a first feature value from the group of input feature values and a second feature value from the group of input feature values; (iii) for each input feature value pair from the group of input feature value pairs, performing a pairwise transformation of the first feature value in the input feature value pair and the second feature value in the input feature value pair to generate a corresponding interactive feature value for the input feature value pair; (iv) for each interactive feature value associated with an input feature value pair from the group of input feature value pairs, determining a scored interactive feature value associated with the input feature value pair based on the interactive feature value and an interactive scoring parameter for the interactive feature value; and (v) from each scored interactive feature value associated with an input feature value pair from the group of input feature value pairs, selecting a third number of scored interactive feature values as a group of output feature values; processing the original feature entry to generate a group of high-order feature values; merging the group of low-order feature values and the group of high-order feature values to generate a processed feature entry corresponding to the original feature entry; and providing the processed feature entry as an input to a prediction unit, wherein the prediction unit is configured to generate one or more predictions using the processed feature entry.

BRIEF DESCRIPTION OF THE SEVERAL VIEWS OF THE DRAWINGS

Figure 1:
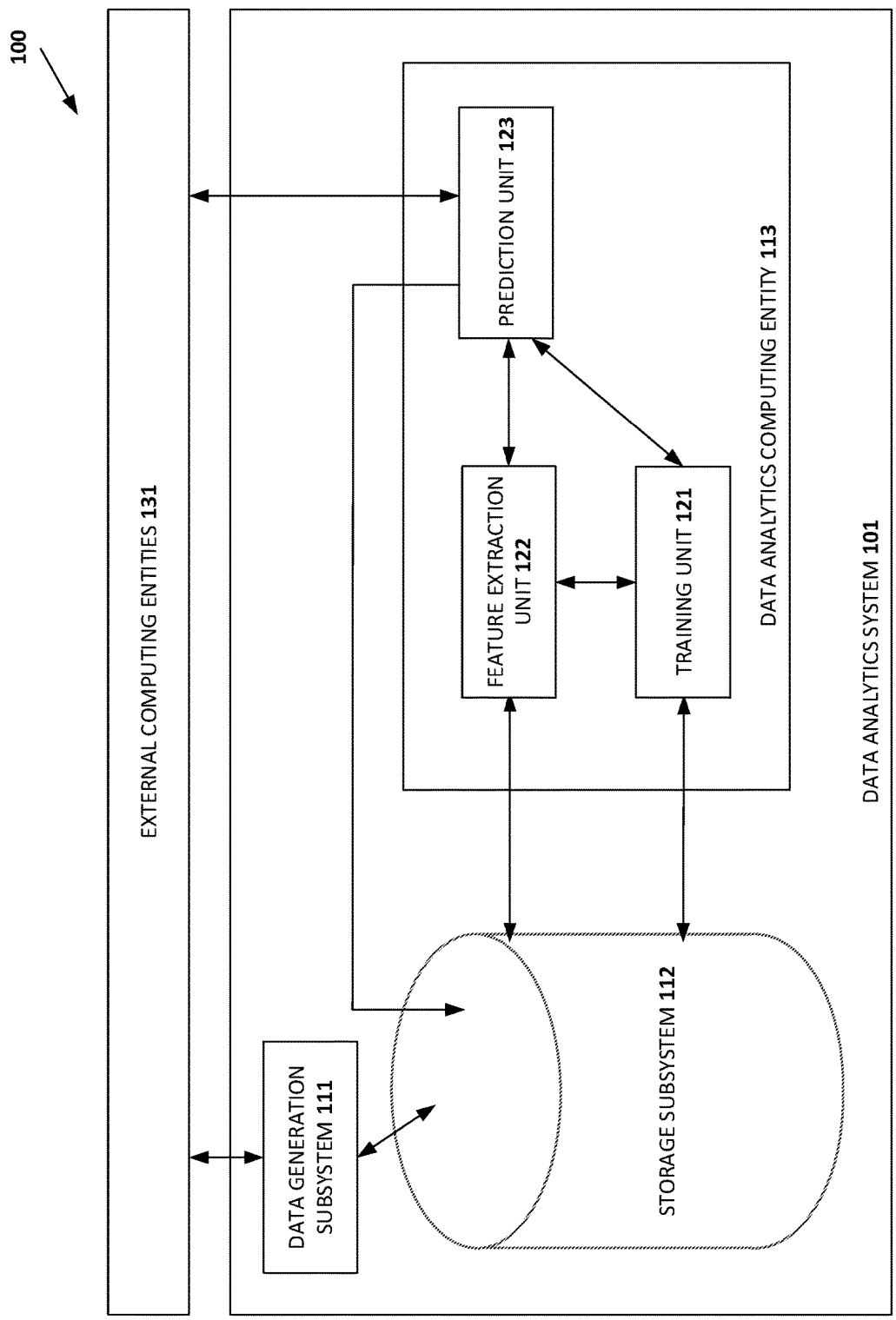

Having thus described the invention in general terms, reference will now be made to the accompanying drawings, which are not necessarily drawn to scale, and wherein:

FIG. 1 is an exemplary overview of an architecture that can be used to practice embodiments of the present invention.

Figure 2:
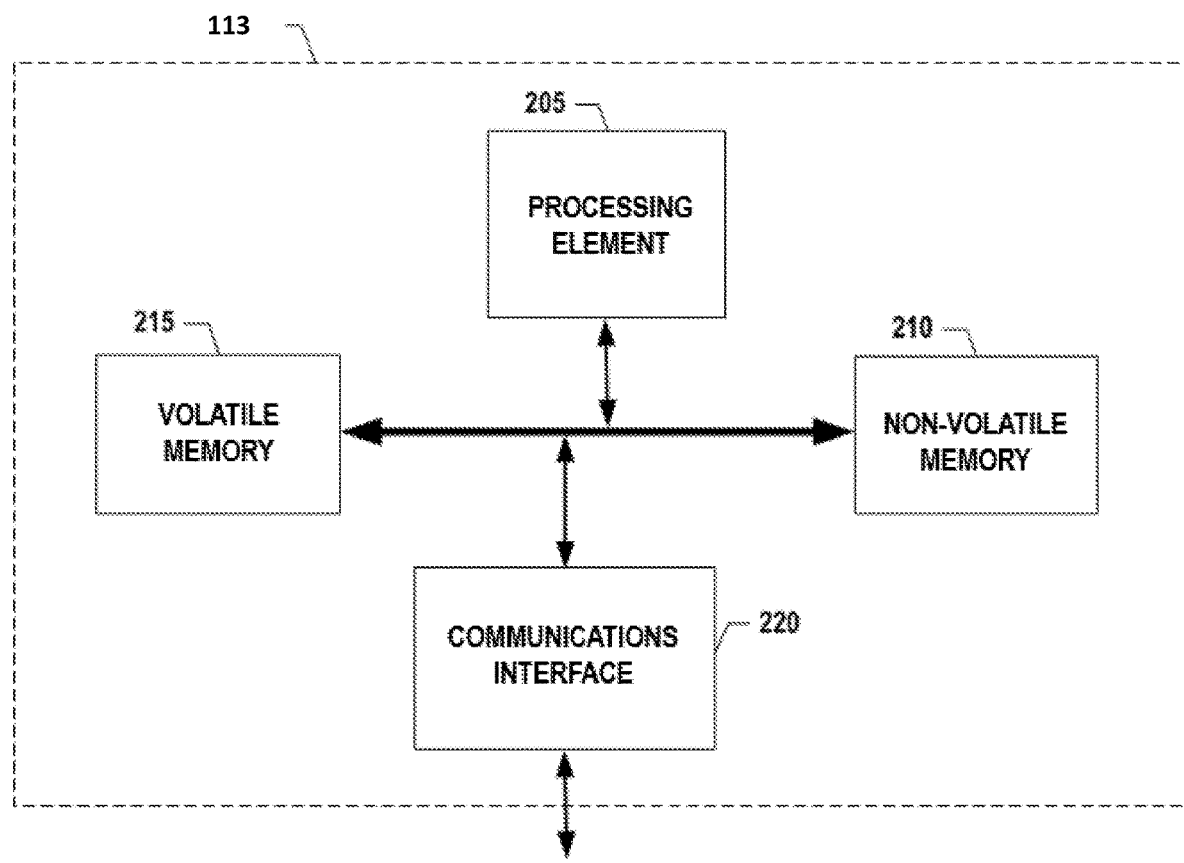

FIG. 2 illustrates an example data analytics computing entity in accordance with some embodiments discussed herein.

Figure 3:
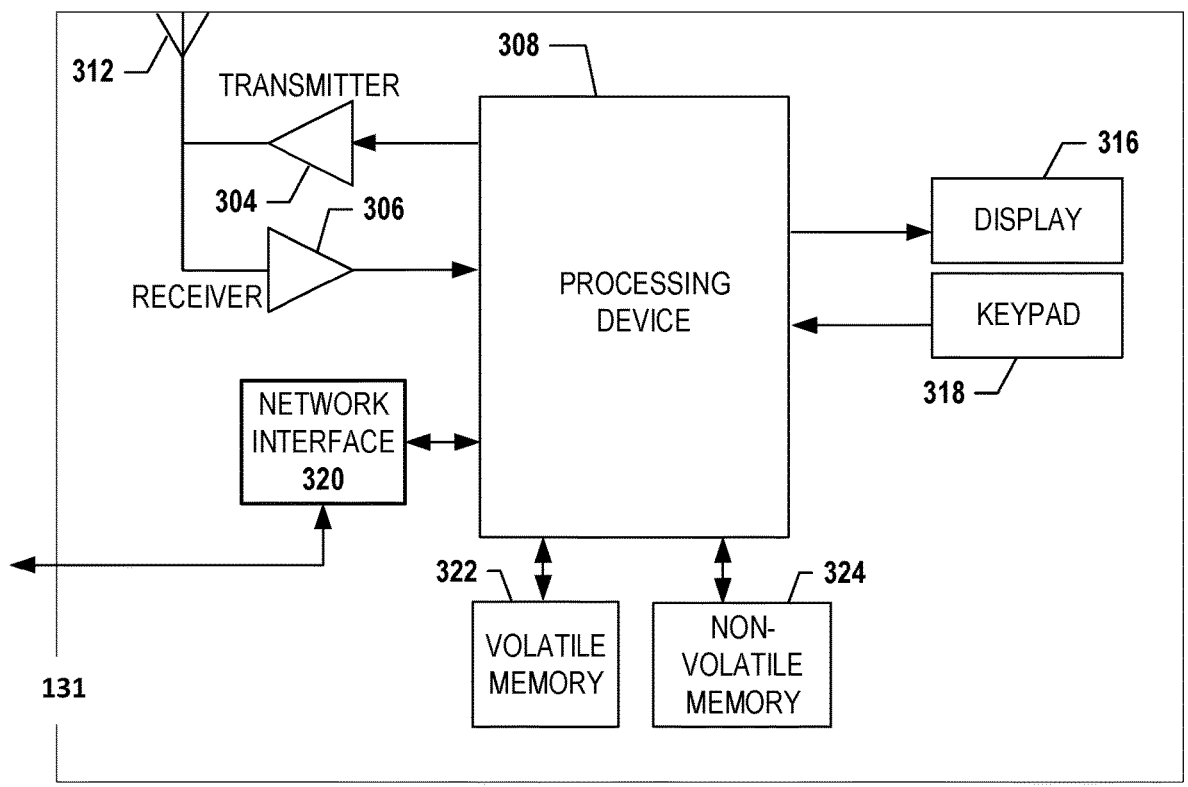

FIG. 3 illustrates an example external computing entity in accordance with some embodiments discussed herein.

Figure 4:
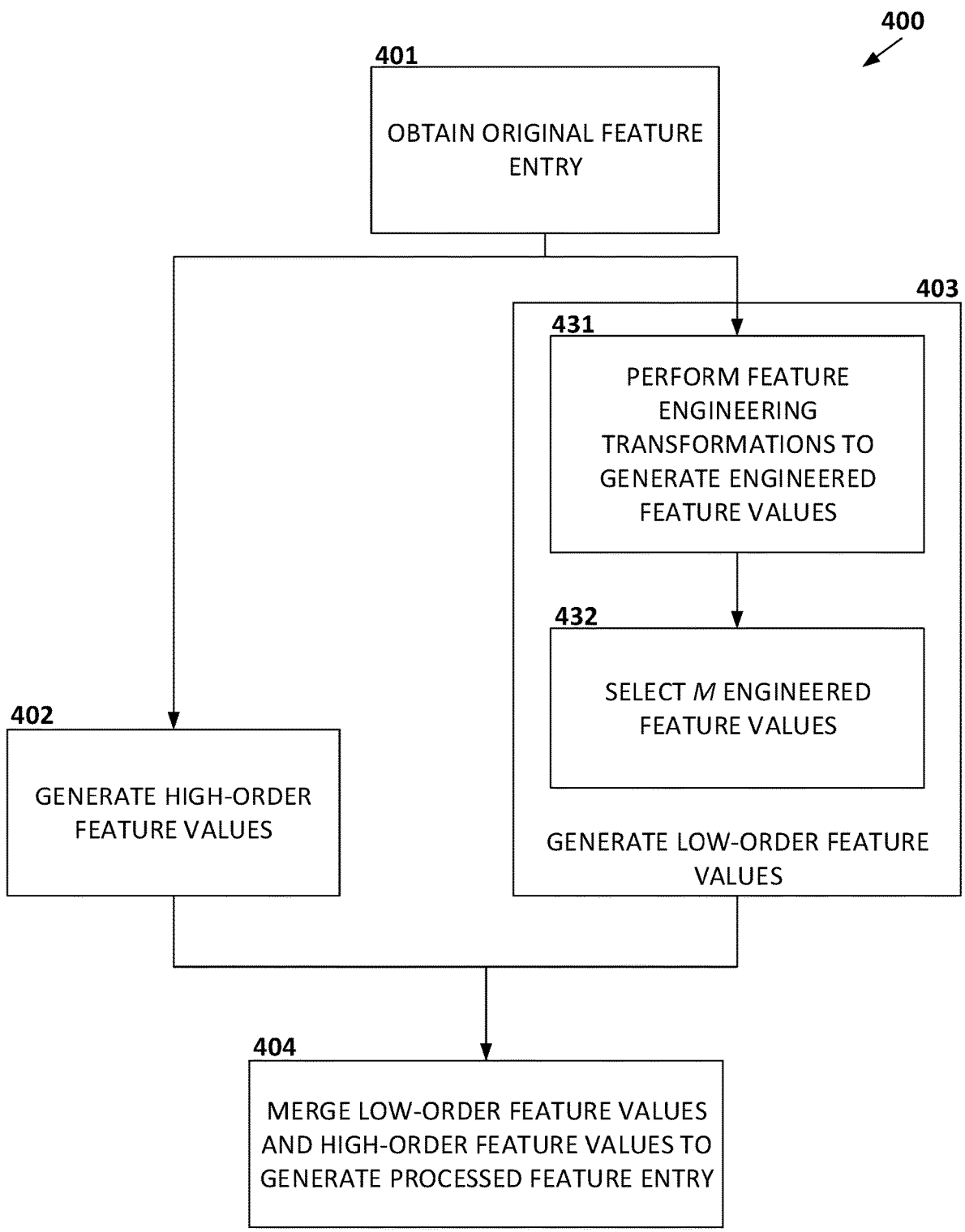

FIG. 4 illustrates a flow diagram of an example process for generating a processed feature entry from an original feature entry in accordance with some embodiments discussed herein.

Figure 5:
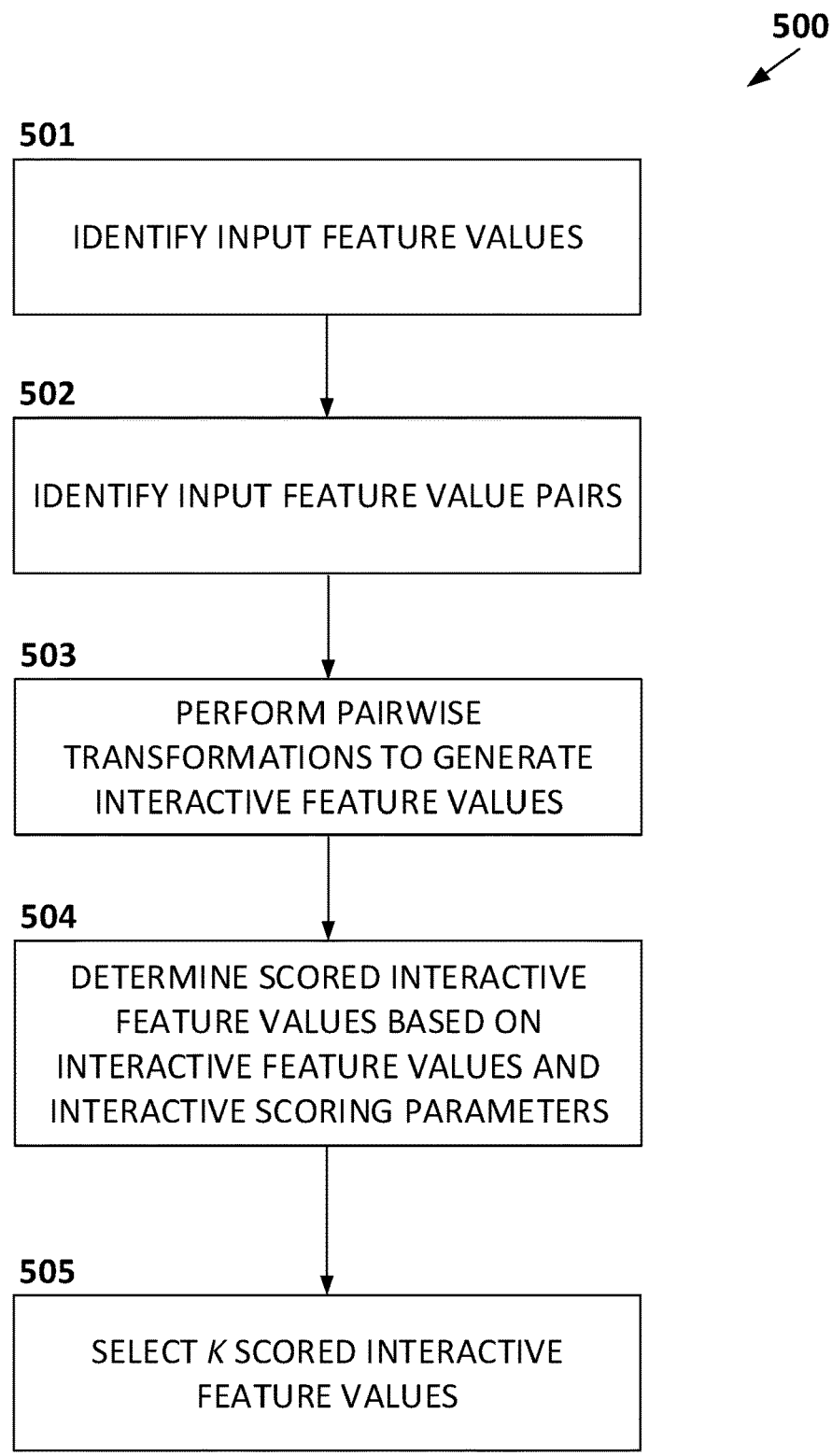

FIG. 5 illustrates a flow diagram of an example process for performing a feature engineering transformation in accordance with some embodiments discussed herein.

Figure 6:
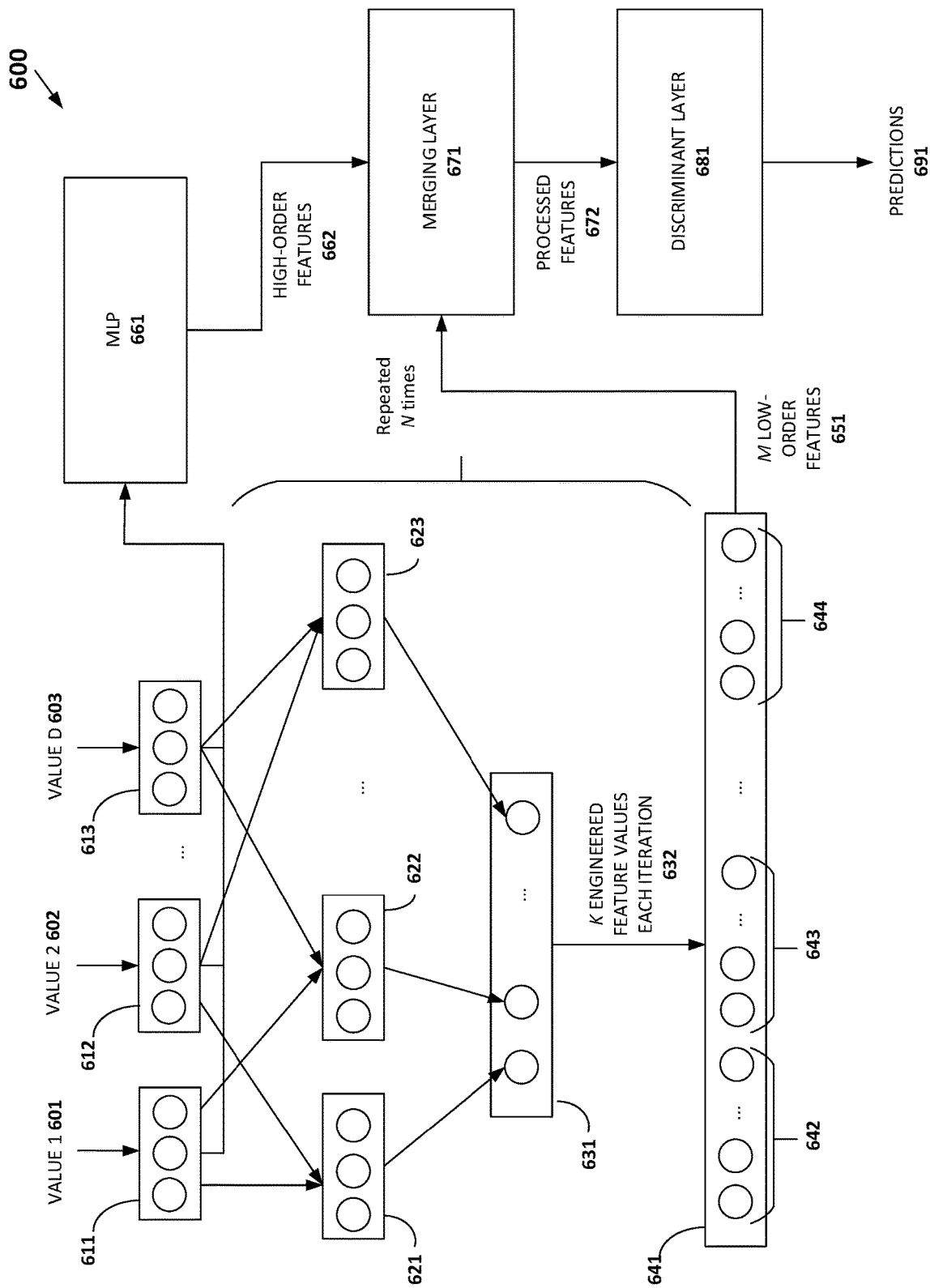

FIG. 6 illustrates a data flow diagram of an example process for performing predictive analytics based on an original feature entry in accordance with some embodiments discussed herein.

Figure 7:
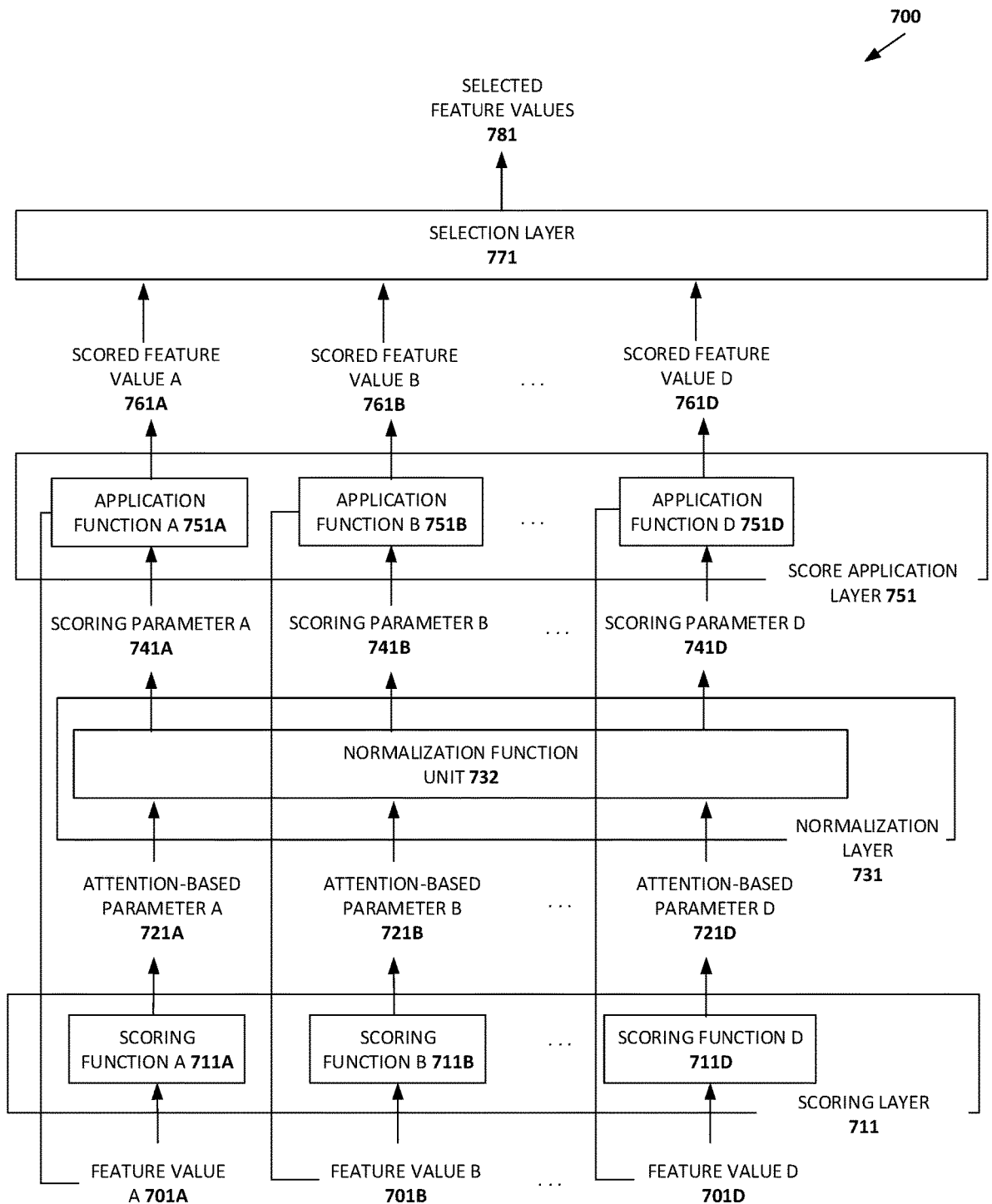

FIG. 7 illustrates a data flow diagram of an example process for determining selected features from a set of input features in accordance with some embodiments discussed herein.

Figure 8:
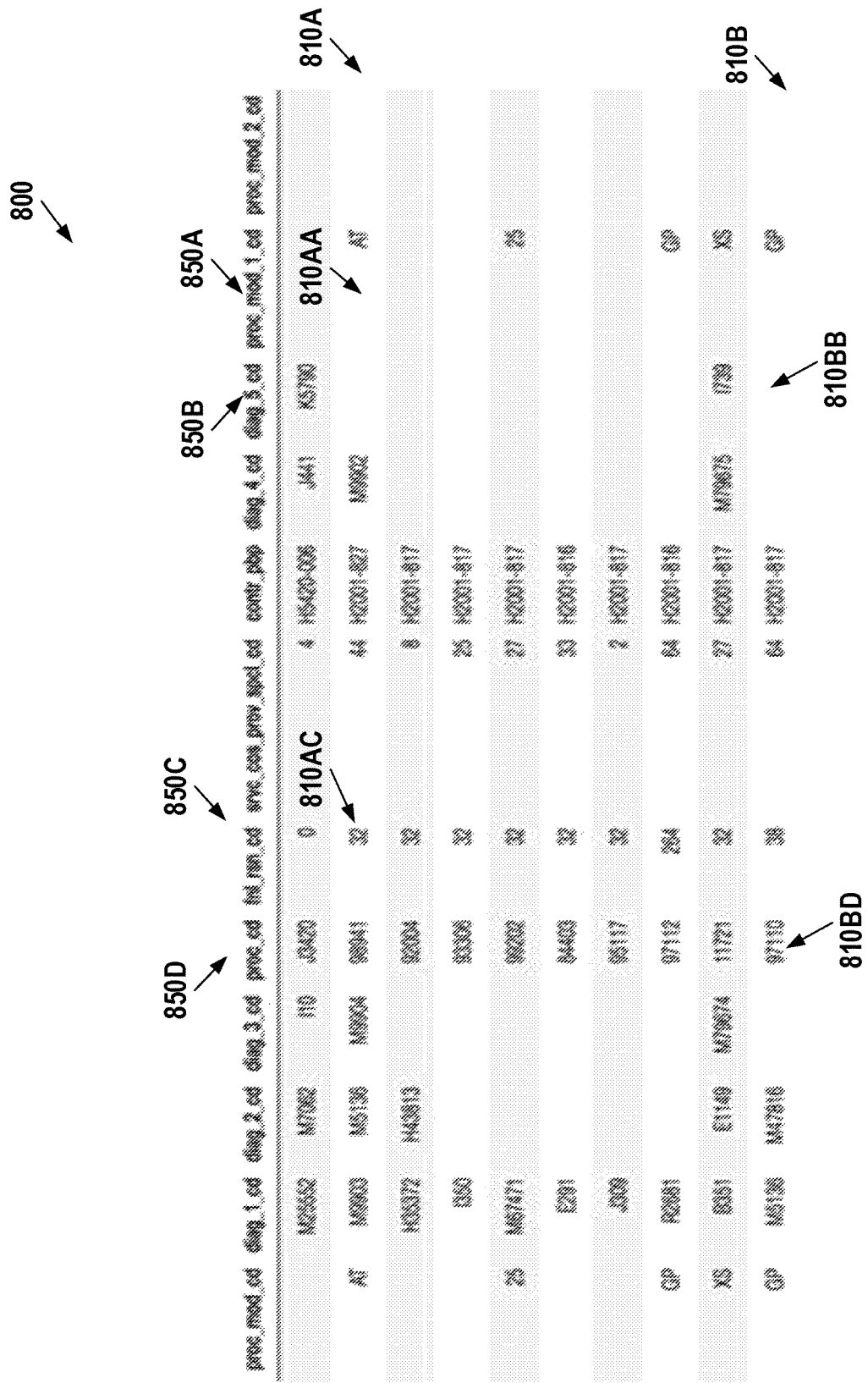

FIG. 8 illustrates an operational example of a group of original feature entries in accordance with some embodiments discussed herein.

DETAILED DESCRIPTION

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. The term "value" is used to refer to both scalar values and vector values. Like numbers refer to like elements throughout. Moreover, while certain embodiments of the present invention are described with reference to predictive data analytics, one of ordinary skill in the art will recognize that the disclosed concepts can be used to perform other types of data analytics.

I. Overview

Discussed herein methods, apparatus, systems, computing devices, computing entities, and/or the like for predictive data analytics with automatic feature extraction. As will be recognized, however, the disclosed concepts can be used to remind a user to perform any type of data analytics and are not limited to a particular context.

A. Technical Problems

Machine learning frameworks process sets of input feature values in accordance with trained parameters to generate output values. The output values may correspond to predictions inferred from the input data. For example, a machine learning framework may process input feature values that describe identity and/or physiological properties of a patient to determine a prediction about a likelihood of the patient suffering from a particular illness. As another example, a machine learning framework may process input feature values that describe properties associated with various transactions pertaining to a financial services account to determine a prediction about likelihood of fraudulent financial activity related to the account.

The parameters of a machine learning framework are determined by training the machine learning framework using training data. Effective and efficient training is critical to success of machine learning frameworks, as an ineffectively trained machine learning framework will fail to produce desirable outputs (e.g., accurate predictions) and a machine learning framework that is difficult to train (e.g., needs excessive training data) may practically be of little use despite a theoretical possibility of success. Thus, there is a need for identification of better training procedures to improve accuracy and/or training efficiency of machine learning frameworks. This may entail finding new feature values to train machine learning frameworks with.

Some data domains, such as data domains related to healthcare and financial services applications, include data collections that are sparse and/or have a high-cardinality. When input feature values have a high sparsity and/or cardinality, machine learning frameworks configured to process those feature values may be more difficult or impossible to train. For example, a machine learning framework may require a substantially greater amount of training before it is sufficiently configured to generate accurate and/or reliable predictions. When trained with limited data, the machine learning framework may fail to produce desired outputs. Thus, machine learning frameworks that deal with highly sparse and/or highly cardinal categorical input data suffer from various complications related to training efficiency and/or accuracy.

One reason for complications associated with training machine learning frameworks with highly sparse and/or highly cardinal categorical training data may be because training a machine learning framework with highly sparse categorical data may require utilizing a greater number of trainable parameters for the machine learning framework, not all of which effectively contribute to calibrating and improving the accuracy of the machine learning frameworks. This in turn creates problems for dimensionality of the cost function used for revising trainable parameters and for complexity and effectiveness of training as a whole. Another reason for that complication may be highly cardinal data include more complex cost models in which isolating optimal cost regions may be challenging.

B. Technical Solutions

Various embodiments of the present invention address problems associated with training efficiency and/or accuracy of machine learning frameworks that use highly sparse and/or high cardinality categorical data by processing the sparse and/or high cardinality categorical input data to reduce the sparsity and/or cardinality of such categorical data before performing additional machine learning on the data. For example, various embodiments of the present invention extract low-order features from original feature values by performing interactions between the original feature values to generate interactive feature values and selecting a group of the feature values, e.g., a group that is expected to be less sparse and/or have less cardinality than the original feature values. Moreover, various embodiments of the present invention extract high-order feature values from original feature values. Furthermore, various embodiments merge low-order feature values and high-order values to generate processed feature values. By reducing sparsity and/or cardinality of categorical data, various embodiments of the present invention can address problems associated with training efficiency of machine learning frameworks that use highly sparse and/or high cardinality categorical data by processing the sparse and/or high cardinality data to reduce the sparsity and/or cardinality of such categorical data before performing additional machine learning using the data.

Various embodiments of the present invention further address problems associated with training efficiency and/or accuracy of machine learning frameworks by selecting low-order features at least in part based on attention-based feature selection mechanisms. The attention-based feature selections utilize a scoring function to score various input feature values, where the scoring function may be associated with trainable parameters; followed by a normalization of scored feature values; and a maximum pooling from the normalized feature values. Through such attention-based feature selection mechanisms, various embodiments of the present invention enable reducing a quantity of input feature values, thus likely reducing sparsity of data. Moreover, by combining the attention-based feature selection parameters with dimensionality transformations, various embodiments of the present invention enable reducing both sparsity and cardinality of data.

Moreover, various embodiments of the present invention further address problems associated with training efficiency and/or accuracy of machine learning frameworks by selecting feature values used for predictive data analytics from a merger of low-order feature values and high-order feature values, thus utilizing powers of both feature extraction methods. In some embodiments, the merger can itself be using a machine learning framework (e.g., a machine learning framework using an attention-based feature selection mechanism) with trainable parameters that enables intelligent selection of processed feature values used for predictive analysis by merging low-order feature values and high-order feature values.

II. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

The architecture 100 includes a data analytics system 101 that interacts with one or more external computing entities 131 (e.g., via a computer network). The external computing entities 131 can provide data to the data analytics system 101 and receive predictions from the data analytics system 101. Each computing entity and/or computing system in the architecture 100 may include any suitable network server and/or other type of processing device. A network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.).

The architecture 100 may be used to perform various data analytics tasks, such as predicting health conditions (e.g., probability of a particular patient having a particular disease) and/or predicting financial conditions (e.g., probability of a particular transaction being fraudulent). In one example, the data analytics system 101 could be a medical record storage and processing platform such as the UnitedHealth Group Analytics Platform. The external computing entities 131 may include computing entities associated with hospitals, doctors' offices, insurance companies, etc. that seek to supply data to and/or retrieve data from a medical record storage and processing platform. In another example, the data analytics platform 101 could be a financial data storage and processing platform. The external computing entities may include computing entities 131 associated with vendor and/or service provider entities that supply data to and/or retrieve data from a medical record storage and processing system.

The data analytics system 101 includes a data generation subsystem 111, a storage subsystem 112, and a data analytics computing entity 113. The data generation subsystem 111 is configured to generate data to store in the storage subsystem 112. The data analytics computing entity 113 is configured to analyze data stored in the storage subsystem 112 to generate one or more predictions.

The data generated by the data generation subsystem 111 and stored in the storage subsystem 112 may include at least one of: (i) one or more groups of original feature entries used by the data analytics computing entity 113 to perform predictions, where each original feature entry includes one or more original feature values; (ii) one or more groups of training data entries used by a training unit 112 of the data analytics computing entity 113 to train at least one of a feature extraction unit 121 of the data analytics computing entity 113 and a prediction unit 123 of the data analytics computing entity 113, where each training data entry includes a set of training feature values and a corresponding set of training prediction values; (iii) data used to configure one or more parameters of at least one component of the data analytics system 101 (e.g., the feature extraction unit 121 and/or the prediction unit 123); and (iv) data related to past performance and/or activity of at least one component of the data analytics system 101 (e.g., the feature extraction unit 121 and/or the prediction unit 123).

The data generation subsystem 111 may generate data based on information received from the external computing entities 113. For example, the data generation subsystem 111 may generate original feature data entries based on health record data provided by one or more external computing entities 131 associated with one or more hospitals. As another example, the data generation subsystem 111 may generate training data entries based on medical record data obtained from one or more external computing entities 131 associated with one or more medical provider institutions.

The data generation subsystem 111 may generate data using information provided by one or more components of the data analytics computing entity 113. For example, the data generation subsystem 111 can generate training prediction values based on past feature extractions by the feature extraction unit 121 and/or past predictions by the prediction unit 123.

Each group of original feature entries generated by the data generation subsystem 111 may be characterized by a set of original features, such that each original feature entry in the respective group of original feature entries includes a defined or undefined original feature value for each original feature in the set of original features characterizing the respective group of original feature entries. For example, a first group of original feature entries may relate to patient identification and may be characterized by original features describing patient name, patient social security number, patient data of birth, patient phone number, etc.

FIG. 8 depicts an operational example 800 of a group of original feature entries. Each original feature entry in the group of feature entries depicted in FIG. 8 is represented by a row in the operational example 800. The group of feature entries is characterized by a set of original features, each original feature represented by a column in the operational example 800, such that each original feature entry includes a defined value (e.g., a non-empty cell) or an undefined value (e.g., an empty cell) for each original feature entry. For example, original feature entry 810A includes, among other values, an undefined value 810AA for the original feature 850A and a defined value of 32 (indicated at 810AC) for the original feature 850C. As another example, original feature entry 810B includes an undefined value 810BB for the original feature 850B and a defined value of 97110 (indicated at 810BD) for the original feature 850D.

In various embodiments the original feature entries generated by the data generation subsystem 111 may have a high sparsity. The sparsity of the original feature entries depends on a quantity of original feature values in the original feature entries that have undefined values. For example, an original feature entry may be characterized by a high sparsity if a large number of original feature entries have undefined values. In various embodiments, the original feature entries 111 generated by the data generation subsystem may have a high cardinality. The cardinality of the original feature entries depends on a range of values, discrete characteristics, and/or the like for each original feature in each set of original features characterizing a group of original features among the original feature entries. For example, the original feature entries may have a high-cardinality if they are characterized by a high number of original feature entries that include discrete feature values.

The storage subsystem 112 may store data as one or more databases, e.g., one or more relational databases. Examples of data stored by the storage subsystem 112 include medical record data, insurance transaction data, bank transaction data, etc.

The storage subsystem 112 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. In various embodiments, the storage subsystem 112 is configured to store questions, attributes for question, and metadata information about operation of the data analytics computing entity 113. For example, the storage subsystem 112 may store one or more of the following attributes for a question: a prompt for a question, question category, question difficulty level, question generator's profile, acceptable answers for a question, hints for a question, attributes describing past user interaction with a question (e.g., a count of how many times the question has been asked before), etc. In various embodiments, the storage subsystem 112 is configured to store a database, such as a relational database. In various embodiments, the storage subsystem 112 is configured to store a file having a preconfigured format, such as JSON format. In various embodiments, metadata information about operation of the data analytics computing entity 113 that is stored in the storage subsystem 112 may include information about interaction of the user 131 with the data analytics computing entity 113. For example, the metadata information can include information about timing of a latest question retrieval by the user computing device 121.

The data analytics computing entity 113 is configured to analyze original feature entries stored in the storage subsystem 112 to generate one or more predictions. For example, the data analytics computing entity 113 may analyze original feature entries related to a medical condition of a patient to generate a prediction. The data analytics computing entity 113 can store its predictions in the storage subsystem 112 and/or provide its predictions as outputs to one or more external computing entities 112.

The data analytics computing entity 113 includes a training unit 121, a feature extraction unit 122, and a prediction unit 123. The training unit 121 is configured to train the feature extraction unit 122 and/or the prediction unit 123 by determining values of trainable parameters used by one or both of the two units. The training unit 121 may determine training data entries based on data that the training unit 121 retrieves from the storage subsystem 112 and/or from data that the training unit receives from at least one external computing entity 131.

The feature extraction unit 122 is configured to process original feature entries that the feature extraction unit 122 retrieves from the storage subsystem 112 in accordance with the trainable parameters of the feature extraction unit 122 to determine one or more processed feature entries for the prediction unit 123. In various embodiments, the feature extraction unit 122 processes each original feature entry to create a corresponding processed feature entry. In various embodiments, the processed feature entries have a lower sparsity and/or a lower cardinality than the original feature entries.

The prediction unit 123 is configured to process the features determined by the feature extraction unit in accordance with the trainable parameters to generate the one or more predictions. The prediction unit may store its predictions in the storage subsystem 112 and/or provide its predictions as outputs to external computing entities 131. In some embodiments, the prediction unit 123 may use at least one machine learning framework, such as a fully connected neural network, a convolutional neural network, etc. In some embodiments, prediction unit 123 could include subunits that use different activation functions for different prediction tasks, e.g., using sigmoid function for binary classification, linear activation for regression, and softmax function for multi-class classification.

A. Exemplary Data Analytics Computing Entity

FIG. 2 provides a schematic of a data analytics computing entity 113 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the data analytics computing entity 113 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the data analytics computing entity 113 may include or be in communication with one or more processing elements 205 (also referred to as processors, processing circuitry, and/or similar terms used herein interchangeably) that communicate with other elements within the data analytics computing entity 113 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the data analytics computing entity 113 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the data analytics computing entity 113 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the data analytics computing entity 113 with the assistance of the processing element 205 and operating system.

As indicated, in one embodiment, the data analyics computing entity 113 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the data analytics computing entity 113 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the data analytics computing entity 113 may include or be in communication with one or more input elements, such as a keyboard input, a mouse input, a touch screen/display input, motion input, movement input, audio input, pointing device input, joystick input, keypad input, and/or the like. The data analytics computing entity 113 may also include or be in communication with one or more output elements (not shown), such as audio output, video output, screen/display output, motion output, movement output, and/or the like.

As will be appreciated, one or more of the management computing entity's 100 components may be located remotely from the data analytics computing entity 113 components, such as in a distributed system. Furthermore, one or more of the components may be combined and additional components performing functions described herein may be included in the data analytics computing entity 113. Thus, the data analytics computing entity 113 can be adapted to accommodate a variety of needs and circumstances. As will be recognized, these architectures and descriptions are provided for exemplary purposes only and are not limiting to the various embodiments.

B. Exemplary External Computing Entity

An external entity may be an individual, a family, a company, an organization, an entity, a department within an organization, a representative of an organization and/or person, and/or the like. An external entity may operate an external computing entity 131 that includes one or more components that are functionally similar to those of the data analytics computing entity 113. FIG. 3 provides an illustrative schematic representative of an external computing entity 131 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 110 can be operated by various parties. As shown in FIG. 3, the external computing entity 131 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the external computing entity 131 may be capable of operating with one or more air interface standards, communication protocols, modulation types, and access types. More particularly, the external computing entity 131 may operate in accordance with any of a number of wireless communication standards and protocols, such as those described above with regard to the data analytics computing entity 113. In a particular embodiment, the external computing entity 131 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 131 may operate in accordance with multiple wired communication standards and protocols, such as those described above with regard to the data analytics computing entity 113 via a network interface 320.

Via these communication standards and protocols, the external computing entity 131 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 131 can also download changes, add-ons, and updates, for instance, to its firmware, software (e.g., including executable instructions, applications, program modules), and operating system.

According to one embodiment, the external computing entity 131 may include location determining aspects, devices, modules, functionalities, and/or similar words used herein interchangeably. For example, the external computing entity 131 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the user computing entity's 121 position in connection with a variety of other systems, including cellular towers, Wi-Fi access points, and/or the like. Similarly, the external computing entity 131 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 131 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 131 to interact with and/or cause display of information from the data analytics computing entity 113, as described herein. The user input interface can comprise any of a number of devices or interfaces allowing the external computing entity 131 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 131 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 131 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 131. As indicated, this may include a user application that is resident on the entity or accessible through a browser or other user interface for communicating with the data analytics computing entity 113 and/or various other computing entities.

In another embodiment, the external computing entity 131 may include one or more components of functionality that are the same or similar to those of the data analytics computing entity 113, as described in greater detail above. As will be recognized, these architectures and descriptions are provided for exemplary purposes only and are not limiting to the various embodiments.

In various embodiments, an external computing entity 131 may be embodied as an artificial intelligence (AI) computing entity, such as an Amazon Echo, Amazon Echo Dot, Amazon Show, Google Home, and/or the like. Accordingly, the external computing entity 131 may be configured to provide and/or receive information/data from a user via an input/output mechanism, such as a display, a camera, a speaker, a voice-activated input, and/or the like.

In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event. For example, the AI computing entity may be configured to retrieve and/or execute a particular program (e.g., the described cognitive evaluation game) in response to an audible, vocal request from a user (e.g., a user speaking an instruction to the AI computing entity to execute the particular program).

IV. Exemplary System Operation

The operation of various embodiments of the present invention will now be described. As discussed herein, various embodiments are directed to systems and methods for predictive data analytics with low-order feature extraction. In various embodiments, features used for prediction are generated by processing original features using low-order feature extraction to generate low-order features, processing the original features using high-order feature extraction to generate high-order features, and merging low-order features and high-order features to generate processed features used for predictive data analytics. Certain embodiments utilize systems, methods, and computer program products that enable a predictive analysis system having a higher training efficiency when trained to perform predictions using high sparsity and/or high cardinality categorical data.

A. Feature Extraction

Various embodiments of the present invention operate on the assumption that the original feature entries stored in the storage subsystem 112 have a high sparsity and/or cardinality, and thus present problems for many matching learning frameworks. Thus, various embodiments of the present invention perform processing on the original feature entries to generate processed feature entries having reduced sparsity and/or cardinality relative to the original feature entries, and use the processed feature entries for prediction by the prediction unit 123.

The processing of an original feature entry may include processing the original feature entry to generate a group of (e.g., one or more) low-order feature values by a low-order feature extraction subunit, processing the feature entry to generate a group of high-order feature values by a high-order feature extraction subunit, and merging the group of low-order feature values and the group of high-order feature values by a feature merging subunit to generate a processed feature entry corresponding to the original feature entry. For example, low-order features can be generated through feature engineering of raw features, e.g., using pairwise interactions, triple-wise interactions, etc. followed by attention-based feature selection. In contrast, high-order features may be generated by processing raw features using a fully connected neural network which causes complicated non-linear interactions among all features.

FIG. 4 depicts a flowchart diagram of a process 400 for generating a processed feature entry from an original feature entry. The process 400 may be performed by a system of one or more computers, such as the data analytics system 100. Via the various operations of process 400, the system can perform feature extraction by merging low-order features and high-order features.

The process 400 begins at step/operation 401 by obtaining the original feature entry. The feature extraction unit 122 may obtain the original feature entry from the data generation subsystem 111, the storage subsystem 112, and/or at least one external computing entity 131. If the original feature entry is stored in the storage subsystem 112, the storage subsystem 112 may receive the original feature entry from the data generation subsystem 111 and/or at least one external computing entity 131. The data generation subsystem 111 and/or the external computing entity 131 may generate the original feature entry based on data obtained from one or more structured data segments and/or one or more unstructured data segments. For example, the data generation subsystem 111 may generate data by aggregating first data retrieved from a structured database and second data obtained by progressing an unstructured data segment using a natural language processing module.

The original feature includes a set of original feature values, where each original feature value corresponds to an original feature. For example, an original feature entry may correspond to identifying information for a particular patient, and may include feature values each corresponding to a first feature related to patient names, a second feature related to patient social security numbers, a third feature related to patient birth dates, etc.

In some embodiments, the data generation subsystem 111 preprocesses the original feature entry to update the original feature entry. For example, the data generation subsystem 111 may modify a number and/or format of feature values in the original feature entry by merging particular feature values in the original feature values, generating one or more new feature values for the original feature entry from one or more old feature values in the original feature entries, and/or embedding at least one feature value in the original feature entry (e.g., using dimensionality transformation) into an n-dimensional space (where n>=1). In some embodiments, the value of n may correspond to a format of expected input of the feature extraction unit 122.

For example, the feature extraction unit 122 may be configured to receive as input four values, where each value is a vector of size three. If the original feature entry includes five scalar values, the data generation subsystem 111 may perform the following transformations on an original feature entry to generate update the original feature entry: (i) processing the five scalar values to generate four scalar values; and (ii) embedding each scalar value into a four-dimensional space.

As represented by step/operation 402, the feature extraction unit 122 processes the original feature entry to generate a group of high-order feature values. As represented by step/operation 403, the feature extraction unit 122 processes the original feature entry to generate a group of low-order feature values. While the functionalities depicted in step/operation 402 and 403 are shown as conducive to parallel implementation in the process 400 depicted in FIG. 4, a person of ordinary skill in the art will recognize that the noted functionalities may be performed sequentially and in any order, e.g., functionalities depicted in step/operation 402 may be performed before or after the functionalities depicted in step/operation 403.

To generate the group of high-order feature values (step/operation 402), the feature extraction unit 122 may process the original feature entry using a neural network. Examples of neural networks used to generate high-order feature values include multi-layered perceptron (MLPs) and convolutional neural networks (CNN). For example, the feature extraction unit 111 may supply each feature value in the original set of feature entries as an input to a neural network and receive, as outputs of the neural network, the group of high-order feature values.

In some embodiments, the neural network used to generate the group of high-order features has an input layer, one or more hidden layers, and an output layer. The input to an input layer of the neural network may correspond to the equation: $a^{(0)}=[e_1, e_2, \ldots e_K]$, where each $e_i$ (where i=1 ... K) is an original feature value of K original feature values in the original feature entry. Moreover, to determine an output for the layer l+1 of the neural network, the feature extraction unit 122 may perform operations defined by the equation:

$$a^{(l+1)}=\phi(W_{MLP}^{(l)}a^{(l)}+b_{MLP}^{(l)}),$$

where a is the output function, $\phi$ is an activation function such as the hyperbolic tangent function, and $W_{MLP}^{(l)}$ and $b_{MLP}^{(l)}$ are trainable parameters of the l-th layer (e.g., the layer immediately before the l+1-th layer). In some embodiments, to obtain the output of the neural network, the feature extraction unit 122 may perform operations defined by the equation:

$$y_{MLP}=\phi(W_{MLP}^{(|H|+1)}a^{(|H|)}+b_{MLP}^{(|H|+1)}),$$

where $y_{MLP}$ is the neural network output function, |H| is the number of hidden layers, $a^{(|H|)}$ is a function that returns the output of the last hidden layer, and $W_{MLP}^{(|H|+1)}$ and $b_{MLP}^{(|H|+1)}$ are trainable parameters of the output layer.

In various embodiments, the feature extraction unit 122 generates the group of high-order feature values with minimal or without any feature engineering transformations, as discussed below. As such, the group of high-order feature values may include imprecise feature values that do not capture all relevant properties of real-world information represented by the original feature entry and/or may create processing problems for the prediction unit 123 because of dimensionality-related issues (e.g., issues related to vanishing gradient).

To generate the group of low-order feature values (step/operation 403), the feature extraction unit 122 may process the original feature entry using feature engineering transformations (step/operation 431) and attention-based feature selections (step/operation 432). As depicted in step/operation 431, the feature extraction unit 122 performs N (e.g., a first number of) iterations of a feature engineering transformation to generate a group of engineered feature values. The feature extraction unit 122 may obtain the value of N by: (i) determining the value of N based on one or more values received from a component of the data analytics system 100 and/or from at least one external computing entity 131 (e.g., an external computing entity 131 configured to supply user input, such as a developer input); and/or (ii) determining the value of N based on an output of a machine learning framework having one or more first trained parameters, such as a neural network having one or more first trained parameters.

An exemplary process 500 for performing a particular iteration of a feature engineering transformation is depicted in FIG. 5. Process 500 may be performed by the feature extraction unit 122 of the data analytics subsystem 113 to generate the group of engineered feature values based on the original feature entry.

Process 500 begins at step/operation 501 with identifying a group of input feature values for the particular iteration. In various embodiments, if the particular iteration is the initial (e.g., first) iteration of the feature engineering transformation, the group of input values for the particular iteration may be determined based on the original feature entry. For example, for the initial iteration, the feature extraction subunit 122 may determine that the group of input feature values for the particular iteration include the feature values in the original feature entry. In various embodiments, if the particular iteration is any iteration of the feature engineering transformation after the initial iteration, the group of input values for the particular iteration may be determined based on a group of output feature values selected in a previous iteration of the feature engineering transformation. For example, for any iteration after the initial iteration, the feature extraction unit 122 may determine that the group of input features for the particular iteration may be the feature values outputted by an immediately previous iteration of the feature engineering transformation.

As depicted in step/operation 502, the feature extraction unit 122 identifies a group of input feature value pairs, wherein each input feature value pair from the group of input feature value pairs includes a first feature value from the group of input feature values and a second feature value from the group of input feature values. In some embodiments, the feature extraction unit 122 identifies, from a group of input feature values, every possible permutation of feature values from the group having size 2.

As depicted in step/operation 503, for each input feature value pair from the group of input feature value pairs, the feature extraction unit 123 performs a pairwise transformation of the first feature value in the input feature value pair and the second feature value in the input feature value pair to generate a corresponding interactive feature value for the input feature value pair.

In various embodiments, the pairwise transformation may include an active summation transformation, for example an active summation transformation performed on a first feature value $e_i$ and a second feature value $e_j$ using operations defined by the equation:

$$f^{add}(e_i, e_j) = \phi(e_i + e_j),$$

where $f^{add}$ is the active summation transformation function and $\phi$ is an activation function such as a hyperbolic tangent function.

In various embodiments, the pairwise transformation may include an active multiplication transformation, for example an active multiplication transformation performed on a first feature value $e_i$ and a second feature value $e_j$ using operations defined by the equation:

$$f^{mul}(e_i, e_j) = \phi(e_i \odot e_j),$$

where $f^{mul}$ is the active multiplication transformation function and $\phi$ is an activation function such as a hyperbolic tangent function.

In various embodiments, the pairwise transformation may include a highway transformation function, such as a highway transformation function performed on a first feature value $e_i$ and a second feature value $e_j$ using operations defined by the equation:

$$f^{highway}(e_i, e_j) = \phi(\tau \odot g(W_h(e_i + e_j) + b_h) + (1 - \tau) \odot (e_i + e_j)),$$

where $f^{highway}$ is the highway transformation function, $\phi$ is an activation function such as a hyperbolic tangent function, $W_h$ and $b_h$ are trainable parameters; g is a nonlinear function, and $\tau$ is a transform gate value. In some embodiments, the transformation gate value may be determined using operations defined by the equation:

$$\tau = \sigma(W_\tau(e_i + e_j) + b_\tau),$$

where $\sigma$ is an activation function such as a sigmoid function and $W_\tau$ and $b_\tau$ are trained parameters.

As depicted in step/operation 504, for each interactive feature value associated with an input feature value pair from the group of input feature value pairs, the feature extraction unit 122 determines a scored interactive feature value associated with the input feature value pair based on the interactive feature value and an interactive scoring parameter for the interactive feature value. Moreover, as depicted in step/operation 505, the feature extraction unit selects, from each scored interactive feature value associated with an input feature value pair from the group of input feature value pairs, K (e.g., a third number of) scored interactive feature values as a group of output feature values for the particular iteration.

In various embodiments, the feature extraction unit 122 processes each interactive feature in accordance with an interactive scoring parameter for the interactive feature value (e.g., multiplies each interactive feature with the corresponding interactive scoring parameter for the interactive feature value) to determine a scored interactive feature value for the interactive feature value. Thereafter, the feature extraction unit 122 selects K scored interactive feature values, e.g., the K highest scored interactive feature values, as the group of output feature values for the particular iteration.

If the particular iteration is a non-final iteration of the feature engineering transformation (e.g., every iteration except the Nth, or last, iteration), the feature engineering transformation 122 may use the group of output feature values for the particular iteration to generate the group of input values for an immediately subsequent iteration. If the particular iteration is a final iteration of the feature engineering transformation (e.g., the Nth, or last, iteration), the feature engineering transformation 122 may use the group of output feature values for the particular iteration to generate the group of engineered feature values for the N iterations, e.g., may select the group of output feature values for the particular iteration as the group of engineered feature values for the N iterations.

In some embodiments, performing the particular iteration of the feature engineering transformation includes generating the interactive scoring parameter for each interactive feature value generated during the iteration. In some embodiments, the feature extraction unit 122 determines the interactive scoring parameter for an interactive feature value by applying a scoring function (e.g., a hyperbolic tangent function with trained parameters) to the interactive feature value to generate an attention-based parameter for the respective interactive feature value; applying a normalization function (e.g., a softmax normalization function) to the attention-based parameter to generate a normalized attention-based parameter for the respective interactive feature value; and determining the interactive scoring parameter for the interactive feature value based on the normalized attention-based parameter for the respective interactive feature value. In some embodiments, the scoring function is characterized by one or more trained parameters for each interactive feature value.

An example process 700 for determining a particular number of features (e.g., K scored interactive features in operations depicted in steps/operations 504 and 505) from a particular set of features (e.g., the set of each interactive feature value associated with an input feature value pair from the group of input feature value pairs generated in a particular iteration by the operations depicted in steps/operations 501-503) is depicted in the data flow diagram of FIG. 7. Process 700 uses an attention-based feature selection mechanism and may be used to perform, for example, either or both of: (i) determining K scored interactive features in a particular iteration of the feature engineering transformation, as depicted in step/operation 431 of FIG. 4 and in FIG. 5; and (ii) determining M (e.g., a second number of) feature values from the group of engineered feature values determined after performing N iterations of the feature engineering transformation function.

Returning to FIG. 4, as indicated in step/operation 432, the feature extraction unit 122 determines the group of low-ordered feature values based on K (e.g., a second number of) feature values from the group of engineered feature values. For example, the feature extraction unit 122 may determine the group of low-ordered features by processing the group of output features for a final iteration of the N iterations of the feature engineering transformation using an attention-based feature selection mechanism, e.g., the mechanism used by process 700 of FIG. 7, as further described below.

As indicated in step/operation 404, the feature extraction unit 122 merges the group of low-order feature values and the group of high-order feature values to generate a processed feature entry corresponding to the original feature entry. For example, the feature extraction unit 122 may combine (e.g., using a linear combination) the group of low-order feature values and the group of high-order feature values to generate a processed feature entry. As another example, the feature extraction unit 122 may provide the group of low-order feature values and the group of high-order feature values to a machine learning unit with trained parameters, and determines a merger of the group of low-order feature values and the group of high-order feature values based on an output of the machine learning unit.

B. Predictive Analytics

The prediction unit 123 uses the processed feature entry to perform one or more predictions. For example, the prediction unit 123 may analyze the processed feature entry to determine one or more predictions about health of a patient. As another example, the prediction unit 123 may analyze the processed feature entry to determine one or more predictions about likelihood of fraudulent nature of a transaction. As yet another example, the prediction unit 123 may analyze the processed feature entry to determine one or more predictions about future asset prices.

FIG. 6 is a data flow diagram of an example process 600 for performing a predictive data analytics using an original feature entry. The process 600 may be performed by a system of one or more computers, such as the data analytics system 100. Via the various operations of process 600, the system can perform predictive analytics using processed features generated by merging low-order features and high-order features.

The process 600 begins by operations performed by multiple embedding units, such as embedding units 611, 612, and 613. Each embedding unit processes an original feature value from the original feature entry, such as feature value 1 601, feature value 2 602, and feature value D 603, to generate an embedded feature value corresponding to an original feature value in the original feature entry. For example, embedding unit 611 processes original feature value 1 601 to generate an embedded feature value; embedding unit 612 processes original feature value 2 602 to generate an embedded feature value; and embedding unit 613 processes original feature value 3 603 to generate an embedded feature value.

Process 600 continues by N iterations of operations performed by multiple pairwise transformation units, such as pairwise transformation units 621, 622, and 623, followed by operations performed by a K-max attention-based feature selection unit 631. Each pairwise transformation unit 621-623 performs a pairwise transformation on a pair of embedded feature values to generate an interactive feature value. For example, the pairwise transformation unit 621 performs a pairwise transformation on embedded features generated by embedding units 611 and 612 to generate an interactive feature value; the pairwise transformation unit 622 performs a pairwise transformation on embedded features generated by embedding units 611 and 613 to generate an interactive feature value; and the pairwise transformation unit 623 performs a pairwise transformation on embedded features generated by embedding units 612 and 613 to generate an interactive feature value. Then, the K-max attention-based feature selection unit 631 selects K engineered features values 632 based on the interactive feature values generated by each pairwise transformation unit 621-623.

After the N iterations, an M-max attention-based feature selection unit 641 aggregates the K engineered feature values generated during each iteration. For example, the M-max attention-based feature selection unit 641 stores the K engineered feature values generated after a first iteration in memory locations 642, stores the K engineered feature values generated after an sth iteration in memory locations 643, and stores the K engineered feature values generated after an Nth iteration in memory locations 644. The M-max attention-based feature selection unit 641 selects M low-ordered features based on the stored engineered feature values.

The process 600 also includes processing the embedded features generated by the embedding feature units using an MLP to generate high-order features 662 as well as merging the high-order features 662 and the low-order features 651 to generate processed features 672. Thereafter, a discriminant layer 681 processes the processed features 672 to generate one or more predictions 691. The discriminant layer 6181 may use different machine learning frameworks to accomplish different tasks associated with different types of prediction. For example, the discriminant layer may use a sigmoid function for binary classification, linear activation for regression, and softmax function for multi-class classification.

C. Attention-Based Feature Selection

To limit a quantity of features, the feature selection unit 122 may be configured to select a particular number of features from a set of input features. For example, the feature selection unit 122 may be configured to select M features based on D features, where M<D. This may assist, for example, in reducing cardinality of data.

FIG. 7 is a data flow diagram of an example process 700 for selecting a particular number of features from a set of input features. The process 700 may be performed by a system of one or more computers, such as the data analytics system 100. Via the various operations of FIG. 7, the system can perform feature selection, a task critical to many feature extraction processes, such as the process 400 depicted in FIG. 4.

The process 700 begins by operations performed by the scoring layer 711. The scoring layer 711 includes multiple scoring function units, such as scoring function unit A 711A, scoring function unit B 711B, and scoring function unit D 711D. Each scoring function unit 711A-D processes an input feature value to generate an attention-based parameter. For example, scoring function unit A 711A processes input feature value A 701A to generate the attention-based parameter A 721A; scoring function unit B 711B processes input feature value B 701B to generate the attention-based parameter B 721B; and scoring function unit D 711D processes input feature value D 701D to generate the attention-based parameter D 721D.

For example, applying the scoring function to a set of input features $x_i$ may include performing operations defined by the equation:

$$u_i = \tan h(Wx_i + b),$$

where $u_i$ is the set of attention-based parameters corresponding to set $x_1$, tanh is a scoring function such as a hyperbolic tangent function, and W and b are trainable parameters which may be embodied as matrices and/or vectors.

For example, if the i-th input $x_i$ is an N×1 vector, W may be an N×N matrix and b may be an N×1 vector. W and b may be initialized by an initialization technique, such Xavier uniform initialization, He normal initialization etc. W and b may be determined using training, e.g., by optimizing an objective function through calculating the partial derivative of the objective function with respect to W and b respectively and using gradient descent with backpropagation to update the values of W and b respectively.

Process 700 continues by operations performed by the normalization layer 731, which includes a normalization function unit 732. The normalization function unit 732 is configured to process attention-based parameters to generate, for each attention-based parameter, a corresponding scoring parameter. For example, the normalization function unit 732 processes the attention-based parameter A 721A to generate scoring parameter A 741A; processes the attention-based parameter B 721B to generate scoring parameter B 741B; and processes the attention-based parameter D 721D to generate scoring parameter D 741D.

For example, processing a set of attention-based parameters $u_i$ to generate a corresponding set of scoring parameters $\alpha_i$ may include performing the operations defined by the equation:

$$\alpha_i = softmax(u_i^T p) = \frac{e^{(u_i^T p)}}{\sum_{j=1}^{N} e^{(u_j^T p)}},$$

wherein softmax is a softmax normalization function, which is used to represent a categorical distribution over the output categories $\alpha_i$, $u_i^T$ indicates a transpose of a matrix representation of $u_i$, e is an exponential function, p is a trainable context vector, and $\Sigma$ is a summation function.

For example, if the i-th input $u_i$ is an N×1 vector, p may be an N×1 vector, which may be determined using training, e.g., by optimizing an objective function through calculating the partial derivative of the objective function with respect to p and using gradient descent with backpropagation to update the values of p.

Process 700 continues by operations performed by the score application layer 751. The score application layer 751 includes multiple score application function units, such as score application function unit A 751A, score application function unit B 751B, and score application function unit D 751D. Each score application function unit applies the scoring parameter for an input feature value to generate a scored feature value for the input feature value. For example, score application function unit A 751A applies scoring parameter A 741A to the input feature value A 701A to generate scored feature value A 761A; score application function unit B 751B applies scoring parameter B 741B to the input feature value B 701B to generate scored feature value B 761B; and score application function unit D 751D applies scoring parameter D 741D to the input feature value A 701D to generate scored feature value A 761D.

Process 700 continues by operations performed by the selection layer 761. The selection layer 761 selects the particular number of selected feature values 781 from the scored feature values it receives from the score application layer 751. For example, the selection layer 761 may select the particular number of scored feature values having the highest values as the selected feature values 781. In various embodiments, to select K features, the selection layer 761 may perform operations defined by the equation:

$$\max_K(\alpha_1 x_1, \ldots \alpha_i x_i, \ldots, \alpha_N x_N),$$

where each $\alpha_i x_i$ (where i=1 . . . N) is a scored feature value received from the score application layer 751 and N is the number of scored feature values received from the score application layer 751.

D. Training the Data Analytics Computing Entity

At least one component of the data analytics computing entity 113 may be trained using a method that optimizes parameters of the component to minimize an error function or maximize a utility function associated with the performance of the component. For example, a component may be trained using a training method that uses a gradient descent training method. If the component has multiple subunits and/or layers, the subunits and layers may be trained using a training algorithm that uses backpropagation.

The feature extraction unit 122 may be trained to identify appropriate features for extraction and later use in prediction algorithms by: (i) generating a group of processed feature values based on a set of training feature values; (ii) providing the group of processed feature values to a prediction unit; (iii) identifying a first prediction value by the prediction unit generated using the prediction unit; (iv) identifying a training prediction value for the group of training feature values; (v) computing a measure of deviation between the training prediction value and the first prediction value; and/or (vi) determining one or more desired parameters for the feature extraction unit 122 using the measure of deviation and a gradient of an error function associated with the performance of the data analytics subsystem.

For example, the feature extraction unit 122 may process an initial feature vector of n data fields that corresponds to a data structure containing medical information for a particular patient (e.g., where at least some of the n data fields may describe identifying information for the particular patient, medical measurements for the particular patient, lab testing results for the particular patient, etc.) to generate a processed feature vector of m data fields, where the processed feature vector may be used by the prediction unit 123 to generate a prediction about health of the particular patient. As described above, to perform this processing, the feature extraction unit 122 may utilize various machine learning engines each having one or more machine learning parameters (e.g., a feature interaction engine, an attention-based feature selection engine, an MLP engine, etc.). Once the prediction unit 123 generates a particular prediction about health of a particular patient based on a particular processed feature vector associated with an initial feature vector and using the various machine learning engines, the training unit 121 may retrieve a ground-truth (e.g., empirical) observation about health of the particular patient and compute a measure of deviation between the prediction about health of the particular patient and the ground-truth observation about health of the particular the patient.

The training unit 121 may then use the computed measure of deviation (e.g., in addition to one or more other measures of deviations between predictions and corresponding ground-truth observations) to compute an overall measure of deviation for the feature extraction unit 122. The training unit 121 may further generate one or more error models for the feature extraction unit 122, where each error model maps the overall measure of deviation as a function of values for at least some of the machine learning parameters associated with the feature extraction unit 122. In some embodiments, the training unit 122 may generate a single error model for all of the machine learning parameters associated with the feature extraction unit 122. In some other embodiments, the training unit 122 may generate a separate error model for the machine learning parameters associated with each machine learning engine of the various machine learning engines associated with the feature extraction unit 122.

Once the training unit 121 generates the one or more error models for the feature extraction unit 122, then the training unit 121 can optimize each particular error model to determine updated values for the machine learning parameters associated with the particular error model, e.g., determine the combination of machine learning parameters associated with the particular error model that produces a local or global minimum for the overall measure of deviation modeled associated with the particular error model. For example, the training unit 121 may perform this optimization through gradient descent, e.g., by computing a gradient (i.e., partial derivative) of the error function for a particular error model with respect to each machine learning parameter associated with the particular error model and using each computed gradient for the particular error model to find a minimum value of the error function associated with the particular error model. If the particular error model is associated with machine learning parameters for a plurality of machine learning engines where at least a first machine learning engine receives as inputs the outputs of a second machine learning engine, the training unit 121 may use backpropagation to use gradient measures of machine learning parameters for more latent machine learning engines to compute gradient measures of machine learning parameters for more preliminary machine learning engines.

The prediction unit 123 may be trained to generate accurate predictions by: (i) generating a group of processed feature values based on a set of training feature values; (ii) providing the group of processed feature values to a prediction unit; (iii) identifying a first prediction value by the prediction unit generated using the prediction unit; (iv) identifying a training prediction value for the group of training feature values; (v) computing a measure of deviation between the training prediction value and the first prediction value; and/or (vi) determining one or more desired parameters for the prediction unit 123 using the measure of deviation and a gradient of an error function associated with the performance of the data analytics subsystem.

For example, the prediction unit 123 may process a processed feature vector of size m using one or more machine learning parameters to generate a prediction about health of a particular patient. Once the prediction unit 123 generates a particular prediction about health of a particular patient based on a particular processed feature vector, the training unit 121 may retrieve a ground-truth (e.g., empirical) observation about health of the particular patient and compute a measure of deviation between the prediction about health of the particular patient and the ground-truth observation about health of the particular the patient. The training unit 121 may then use the computed measure of deviation (e.g., in addition to one or more other measures of deviations between predictions and corresponding ground-truth observations) to compute an overall measure of deviation for the prediction unit 123. The training unit 121 may further generate an error model for the prediction unit which maps the overall measure of deviation as a function of values for the machine learning parameters associated with the prediction unit 123.

The training unit 121 can then optimize the error model by determining the combination of machine learning parameters associated with the prediction unit 123 that produces a local or global minimum for the overall measure of deviation modeled associated with the prediction unit 123. For example, the training unit 121 may perform this optimization through gradient descent, e.g., by computing a gradient (i.e., partial derivative) of the error function with respect to each machine learning parameter associated with the prediction unit 123. The training unit 121 may then use each computed gradient for the particular error model to find a minimum value of the error function associated with the prediction unit 123. If the particular error model is associated with machine learning parameters for a plurality of machine learning engines where at least a first machine learning engine receives as inputs the outputs of a second machine learning engine, the training unit 121 may use backpropagation to use gradient measures of machine learning parameters for more latent machine learning engines to compute gradient measures of machine learning parameters for more preliminary machine learning engines.

The prediction unit 123 may retrieve the training data from the storage subsystem 112 using Structured Query Language (SQL) statements. The training data may be stored in a tabular file, where the number of rows represents the number of training samples and number of columns represents the number of features that may have corresponding values in each training sample. Each feature can, for example, have a numeric or categorical type.

V. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

For example, the foregoing description provides various examples of utilizing systems and methods for monitoring cognitive capability of a user. However, it should be understood that various embodiments of the systems and methods discussed herein may be utilized for providing reminders of any activity, such as exercising, eating healthy snacks, performing a particular task, calling another individual, and/or the like.

The invention claimed is:

1. A computer-implemented method comprising:
   inputting, by one or more processors, an original feature vector comprising a plurality of categorical feature values to a machine learning framework, wherein:
   (i) the machine learning framework comprises a low-order feature selection layer, a high-order feature selection layer, and a discriminant layer,
   (ii) the low-order feature selection layer comprises a plurality of pairwise transformation units joined to a k-max attention-based feature selection mechanism with one or more trainable parameters configured to output a group of low-order feature values from a plurality of low-order feature values generated by the plurality of pairwise transformation units, and
   (iii) at least one of the group of low-order feature values corresponds to a pairwise transformation of two of the plurality of categorical feature values;
   receiving, by the one or more processors and from the k-max attention-based feature selection mechanism, the group of low-order feature values for the original feature vector;
   receiving, by the one or more processors and from the high-order feature selection layer, a group of high-order feature values for the original feature vector;
   inputting, by the one or more processors, a processed feature vector comprising the group of low-order feature values and the group of high-order feature values to the discriminant layer to receive a prediction corresponding to the original feature vector; and
   updating, by the one or more processors and using an error model, the one or more trainable parameters of the k-max attention-based feature selection mechanism based at least in part on a measure of deviation from the prediction and a corresponding ground truth.

2. The computer-implemented method of claim 1, wherein the group of low-order feature values is generated by performing a plurality of iterations of a feature engineering transformation and a number of the plurality of iterations is based at least in part on the one or more trainable parameters.

3. The computer-implemented method of claim 2, wherein (a) an initial iteration of the plurality of iterations comprises identifying a group of input feature values based at least in part on the original feature vector.

4. The computer-implemented method of claim 3, wherein a subsequent iteration after the initial iteration of the plurality of iterations comprises identifying the group of input feature values based at least in part on a preceding group of output feature values selected in the initial iteration.

5. The computer-implemented method of claim 2, further comprising:
   generating the group of low-order feature values based at least in part on a final group of output feature values selected in a final iteration of the plurality of iterations.

6. The computer-implemented method of claim 1, wherein the group of low-order feature values is based on an interactive scoring parameter for the at least one of the group of low-order feature values.

7. The computer-implemented method of claim 1, wherein the high-order feature selection layer comprises a convolutional neural network.

8. A computing system comprising one or more processors and a memory including program code, the memory and the program code configured to, with the one or more processors, cause the computing system to at least:
   input an original feature vector comprising a plurality of categorical feature values to a machine learning framework, wherein:
   (i) the machine learning framework comprises a low-order feature selection layer, a high-order feature selection layer, and a discriminant layer,
   (ii) the low-order feature selection layer comprises a plurality of pairwise transformation units joined to a k-max attention-based feature selection mechanism with one or more trainable parameters configured to output a group of low-order feature values from a plurality of low-order feature values generated by the plurality of pairwise transformation units, and
   (iii) at least one of the group of low-order feature values corresponds to a pairwise transformation of two of the plurality of categorical feature values;
   receive, from the k-max attention-based feature selection mechanism, the group of low-order feature values for the original feature vector;
   receive, from the high-order feature selection layer, a group of high-order feature values for the original feature vector;
   input a processed feature vector comprising the group of low-order feature values and the group of high-order feature values to the discriminant layer to receive a prediction corresponding to the original feature vector; and
   update, using an error model, the one or more trainable parameters of the k-max attention-based feature selection mechanism based at least in part on a measure of deviation from the prediction and a corresponding ground truth.

9. The computing system of claim 8, wherein the group of low-order feature values is generated by performing a plurality of iterations of a feature engineering transformation and (a) an initial iteration of the plurality of iterations comprises identifying a group of input feature values based at least in part on the original feature vector.

10. The computing system of claim 9, wherein, during a subsequent iteration after the initial iteration of the plurality of iterations, the computing system is further caused to identify the group of input feature values based at least in part on a preceding group of output feature values selected in the initial iteration.

11. The computing system of claim 10 further configured to:
    generate the group of low-order feature values based at least in part on a final group of output feature values selected in a final iteration of the plurality of iterations.

12. The computing system of claim 8, wherein the group of low-order feature values is based on an interactive scoring parameter for the at least one of the group of low-order feature values.

13. A non-transitory computer-readable storage medium storing program code instructions that, when executed, cause a computing system to:
- input an original feature vector comprising a plurality of categorical feature values to a machine learning framework, wherein:
  - (i) the machine learning framework comprises a low-order feature selection layer, a high-order feature selection layer, and a discriminant layer,
  - (ii) the low-order feature selection layer comprises a plurality of pairwise transformation units joined to a k-max attention-based feature selection mechanism with one or more trainable parameters configured to output a group of low-order feature values from a plurality of low-order feature values generated by the plurality of pairwise transformation units, and
  - (iii) at least one of the group of low-order feature values corresponds to a pairwise transformation of two of the plurality of categorical feature values;
- receive, from the k-max attention-based feature selection mechanism, the group of low-order feature values for the original feature vector;
- receive, from the high-order feature selection layer, a group of high-order feature values for the original feature vector;
- input a processed feature vector comprising the group of low-order feature values and the group of high-order feature values to the discriminant layer to receive a prediction corresponding to the original feature vector; and
- update, using an error model, the one or more trainable parameters of the k-max attention-based feature selection mechanism based at least in part on a measure of deviation from the prediction and a corresponding ground truth.

* * * * *